(12) United States Patent
Wang et al.

(10) Patent No.: US 7,920,740 B2
(45) Date of Patent: Apr. 5, 2011

(54) HUE SEGMENTATION SYSTEM AND METHOD THEREOF

(75) Inventors: Te-mei Wang, Hsin-Chu (TW); Hung-shing Chen, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 855 days.

(21) Appl. No.: 11/865,239

(22) Filed: Oct. 1, 2007

(65) Prior Publication Data

US 2008/0240552 A1     Oct. 2, 2008

(30) Foreign Application Priority Data

Mar. 30, 2007 (TW) ................. 96111413 A

(51) Int. Cl.
*G06K 9/00* (2006.01)
(52) U.S. Cl. .................................... 382/162
(58) Field of Classification Search ............... None
See application file for complete search history.

(56) References Cited

U.S. PATENT DOCUMENTS

| | | | | |
|---|---|---|---|---|
| 5,767,992 A * | 6/1998 | Tanaka et al. | ............. | 358/520 |
| 5,933,253 A * | 8/1999 | Ito et al. | ............. | 358/500 |
| 5,937,089 A * | 8/1999 | Kobayashi | ............. | 382/167 |
| 6,088,475 A * | 7/2000 | Nagashima et al. | ......... | 382/162 |
| 6,310,696 B1 * | 10/2001 | Kumada | ............. | 358/1.9 |
| 6,618,499 B1 * | 9/2003 | Kohler et al. | ............. | 382/162 |
| 7,081,925 B2 * | 7/2006 | Yang et al. | ............. | 348/655 |
| 7,710,600 B2 * | 5/2010 | Miyahara et al. | ............. | 358/1.9 |
| 2004/0001185 A1 | 1/2004 | Wada | | |
| 2004/0013296 A1 | 1/2004 | Aotsuka | | |
| 2004/0119843 A1 * | 6/2004 | Hoshuyama | ............. | 348/222.1 |
| 2004/0218044 A1 | 11/2004 | Baker | | |
| 2005/0190390 A1 | 9/2005 | Yamada et al. | | |
| 2005/0195420 A1 * | 9/2005 | Gerrits | ............. | 358/1.13 |
| 2007/0013927 A1 * | 1/2007 | Miyahara et al. | ............. | 358/1.9 |
| 2008/0166042 A1 * | 7/2008 | Pan et al. | ............. | 382/164 |

FOREIGN PATENT DOCUMENTS

EP        1363462 A2    11/2003

* cited by examiner

*Primary Examiner* — Yuzhen Ge
(74) *Attorney, Agent, or Firm* — Kirton & McConkie; Evan R. Witt

(57) ABSTRACT

A hue segmentation system and method thereof suitable for image devices are described. First, a plurality of hue segments are generated based on color data of a plurality of colors in a color gamut. Then, the area difference between the hue segments and the color gamut is calculated. If the area difference is greater than a predetermined value, the hue segmentation system searches at least one vertex among the hue segments to divide the segments for generating a plurality of additional hue segments. The above-mentioned steps are performed repeatedly until the area difference is less than the predetermined value. Thus fewer hue segments indicate the color gamut of color processing of the image devices to effectively decrease calculation times and save required memory.

25 Claims, 6 Drawing Sheets

HUE SEGMENTATION SYSTEM AND METHOD THEREOF

FIELD OF THE INVENTION

The present invention generally relates to a color processing method and system thereof, and more particularly, to a hue segmentation method and system to determine the color gamut of an image device.

BACKGROUND OF THE INVENTION

Conventionally, it is required to process each hue angle corresponding to 360 degrees in color space in order to construct the color gamut of an image device. FIG. 1 illustrates a conventional hue segmentation diagram. When constructing the color gamut 100, a color processing system finds the gamut boundary 104 using each hue angle 102 within the color space, such as "CIE L*a*b*" and generates the color gamut 100 having 360 hue pages. It is noted that the various hue angles 102 represent the varied colors, respectively, and various chroma value indicate the brilliant level, i.e. color saturation, of the color.

After generating hue page using 360 hue angles, the color processing system performs mapping and computation operation on the colors within each hue angle. Because the color processing system considerably utilizes many matrix executions on the color space transformation during the procedure of mapping and computation operation, it is quite complex and consumes a lot of computation time for the color processing system. In addition, it is necessary to prepare much more memory to store the color information during the computation procedure. The more complexity and time of the computation procedure, the more memory is required, thereby increasing the manufacturing cost of the image device.

Consequently, there is a need to develop a hue segmentation method to solve the complex and time-consuming problems.

SUMMARY OF THE INVENTION

One object of the present invention is to provide a hue segmentation system and method thereof to construct the color gamut using less color information to decrease the computation complexity and memory usage.

Another object of the present invention is to provide a hue segmentation system and method thereof to save the computation time while the system computes the hue angle to generate the color gamut.

According to the above objects, the present invention sets forth a hue segmentation system and method. The hue segmentation system includes a hue segment generation module, a segment area computation module, a segment area difference computation module, a comparing unit, and an additional hue segment generation module.

The hue segment generation module computes a plurality of hue angles of the basic colors within the color gamut and calculates the maximum chroma value corresponding to each basic hue angle by inputting the color information of the basic colors for generating a plurality of hue segments within the color gamut. The 360 hue angles are defined as the reference hue segments. Each hue segment corresponds to one of the reference hue segments based on the hue angles allocated to the hue segment. In one embodiment, the total area of the reference color gamut is the area of the 360 hue segments. The area of each reference hue segment is equal to the area summation of the two hue segments, i.e. two triangles, corresponding to two hue angles.

The hue segment generation module computes the area of each hue segments and the total area of the hue segments, and then inputs the computation result of the area into the segment area difference computation module.

The segment area difference computation module calculates and records the area difference between the total area of the hue segments and the area of the reference hue segments. The segment area difference computation module accumulates the area difference between each hue segment and each reference hue segment and inputs the accumulated result to the comparing unit.

The comparing unit compares the area difference between the total area of the hue segments and the area of the color gamut with the predetermined precision value. If the area difference between the total area of the hue segments and the area of the color gamut is greater than the predetermined precision value, the additional hue segment generation module selects the hue segment having the maximum area difference according to the area difference between each hue segment and each reference hue segment from the segment area difference computation module. The additional hue segment generation module searches the chroma value to be served as one vertex on the hue segment wherein the vertex on the hue segment has either a minimum chroma value or the maximum chroma value. Thus, the additional hue segment generation module divides the hue segment into a plurality of additional hue segments to replace the hue segments.

Afterwards, the hue segmentation system repeatedly proceeds to the segment area computation module, the segment area difference computation module, the comparing unit, and the additional hue segment generation module until the area difference is smaller than the predetermined precision value. In other words, the total area of the hue segments or the total area of the additional hue segments is approximate to the reference hue segments of the color gamut.

In another embodiment, the hue segmentation system is capable of searching one or more vertexes for generating more additional hue segments to replace the hue segments. Then, the hue segmentation system utilizes the segment area computation module, the segment area difference computation module, the comparing unit, and the additional hue segment generation module until the total area of the hue segments is smaller than the predetermined precision value.

The present invention provides a hue segmentation method and system to solve the problem of conventional 360 hue angles. The hue segmentation method and system utilizes fewer hue pages to effectively decrease calculation times and meets the precision requirement of the color gamut in the image devices. Further, the hue segmentation method and system save required memory usage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
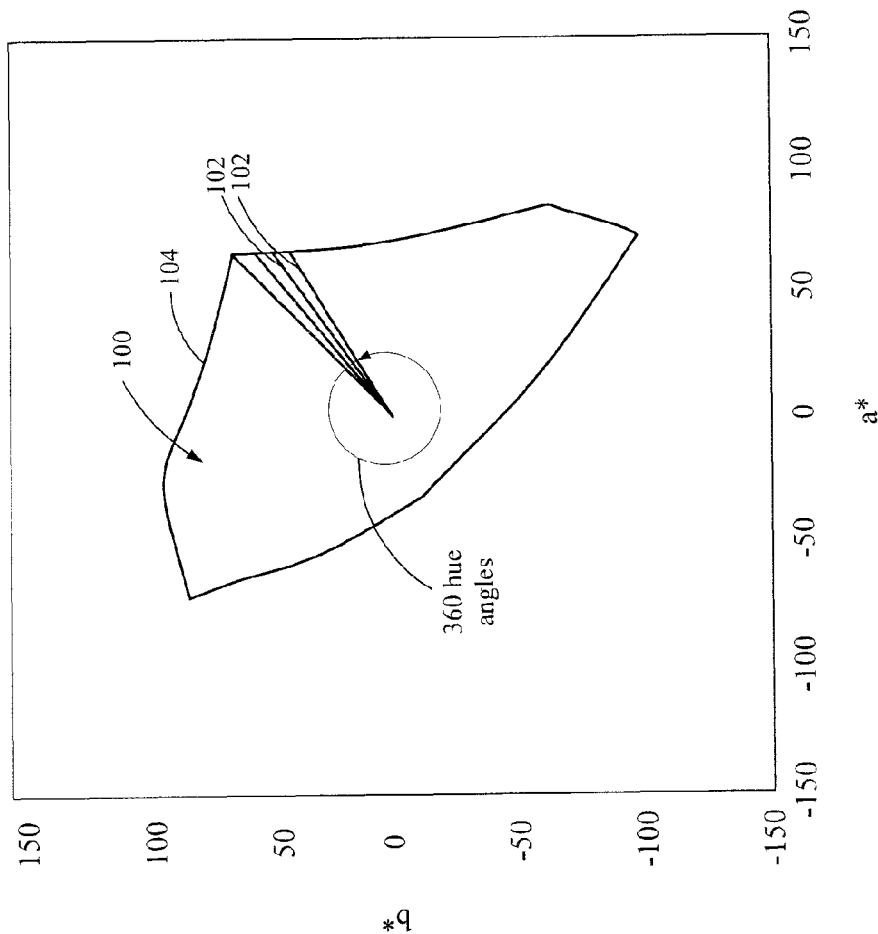
FIG. 1 illustrates a conventional hue segmentation diagram.
Figure 2:
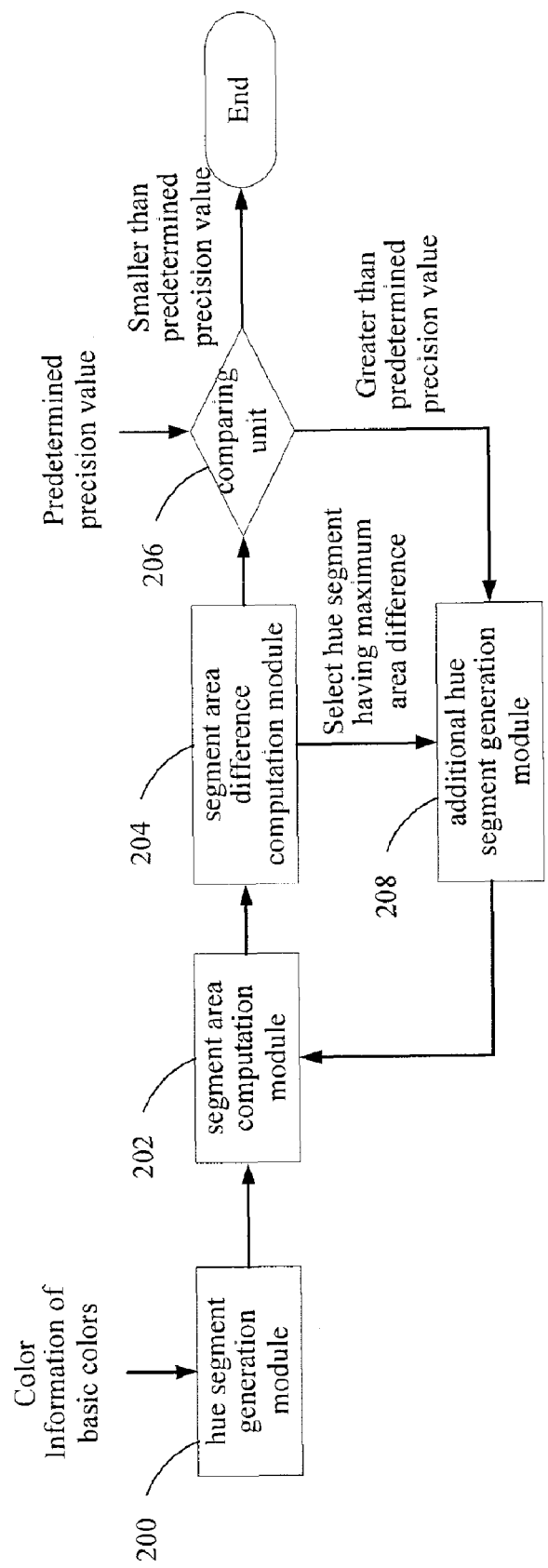
FIG. 2 is a schematic diagram of a hue segmentation system according to one embodiment of the present invention.

FIG. 2 is a schematic diagram of a hue segmentation system according to one embodiment of the present invention. The hue segmentation system is suitable for image system, such as liquid crystal displays (LCDs), printers, scanners, digital still cameras, and other image devices. The hue segmentation system includes a hue segment generation module 200, a segment area computation module 202, a segment area difference computation module 204, a comparing unit 206, and an additional hue segment generation module 208.

The hue segment generation module 200 computes a plurality of hue angles of the basic colors within the color gamut and calculates the maximum chroma value corresponding to each basic hue angle by inputting the color information of the basic colors for generating a plurality of hue segments within the color gamut. Taking account of the description of the present invention, 360 hue angles are defined as the reference hue segments. Each hue segment corresponds to one of the reference hue segments based on the hue angles allocated to the hue segment and the hue segment will be described in detail in following paragraphs. Person skilled in the art should be noted that the hue segment generation module 200 can generate arbitrary number of hue segments using various color information of several colors in addition to forming basic hue angles of the basic colors.

The hue segment generation module 202 computes the area of each hue segments and the total area of the hue segments, and then inputs the computation result of the area into the segment area difference computation module 204.

The segment area difference computation module 204 calculates and records the area difference between the total area of the hue segments and the area of the color gamut. The segment area difference computation module 204 accumulates the area difference between each hue segment and each reference hue segment and inputs the accumulated result to the comparing unit 206.

The comparing unit 206 compares the area difference between the total area of the hue segments and the area of the color gamut with a predetermined precision value. If the area difference between the total area of the hue segments and the area of the color gamut is greater than the predetermined precision value, the hue segmentation system proceeds to the additional hue segment generation module 208 for execution.

The additional hue segment generation module 208 selects the hue segments having the maximum area difference according to the area difference between each hue segment and each reference hue segment from the segment area difference computation module 204. The additional hue segment generation module 208 searches the chroma value to be served as one vertex on a hue segment wherein the vertex on the hue segment has either a minimum chroma value or the maximum chroma value. Thus, the additional hue segment generation module 208 divides the hue segment into a plurality of additional hue segments to replace the hue segments.

The segment area computation module 202 coupled to the additional hue segment generation module 208 computes the area of each divided hue segments, i.e. the additional hue segments, calculates the total area of the divided hue segments, and inputs the calculated result to the segment area difference computation module 204. The segment area difference computation module 204 calculates and records the area difference between the area of the divided hue segments and the area of the corresponding reference hue segment of the color gamut. Further, the segment area difference computation module 204 accumulates the total area difference between each divided hue segment and each reference hue segment and inputs the accumulated result to the comparing unit 206. The comparing unit 206 compares the area difference between the total area of the hue segments from the segment area difference computation module 204 and the area of the color gamut with a predetermined precision value. If the area difference between the total area of the hue segments and the area of the color gamut is greater than the predetermined precision value, the hue segmentation system repeatedly proceeds to the additional hue segment generation module 208, the segment area difference computation module 204, and the comparing unit 206 until the area difference is smaller than the predetermined precision value.

The hue segmentation method, according to the present invention, can be applicable to color space represented by parameters hue, saturation and lightness, such as color space "CIE*a*b*" or "LCh". The lightness coordinate "L*" and two hue coordinates establishes the color space "CIE*a*b*" wherein the coordinate "a*" ranges from the green color to the red color and the coordinate "b*" ranges from the blue color to the yellow color. The lightness coordinate "L", the chroma coordinate "C" and the hue angle coordinate "h" constructs the color space "LCh".

Figure 3:
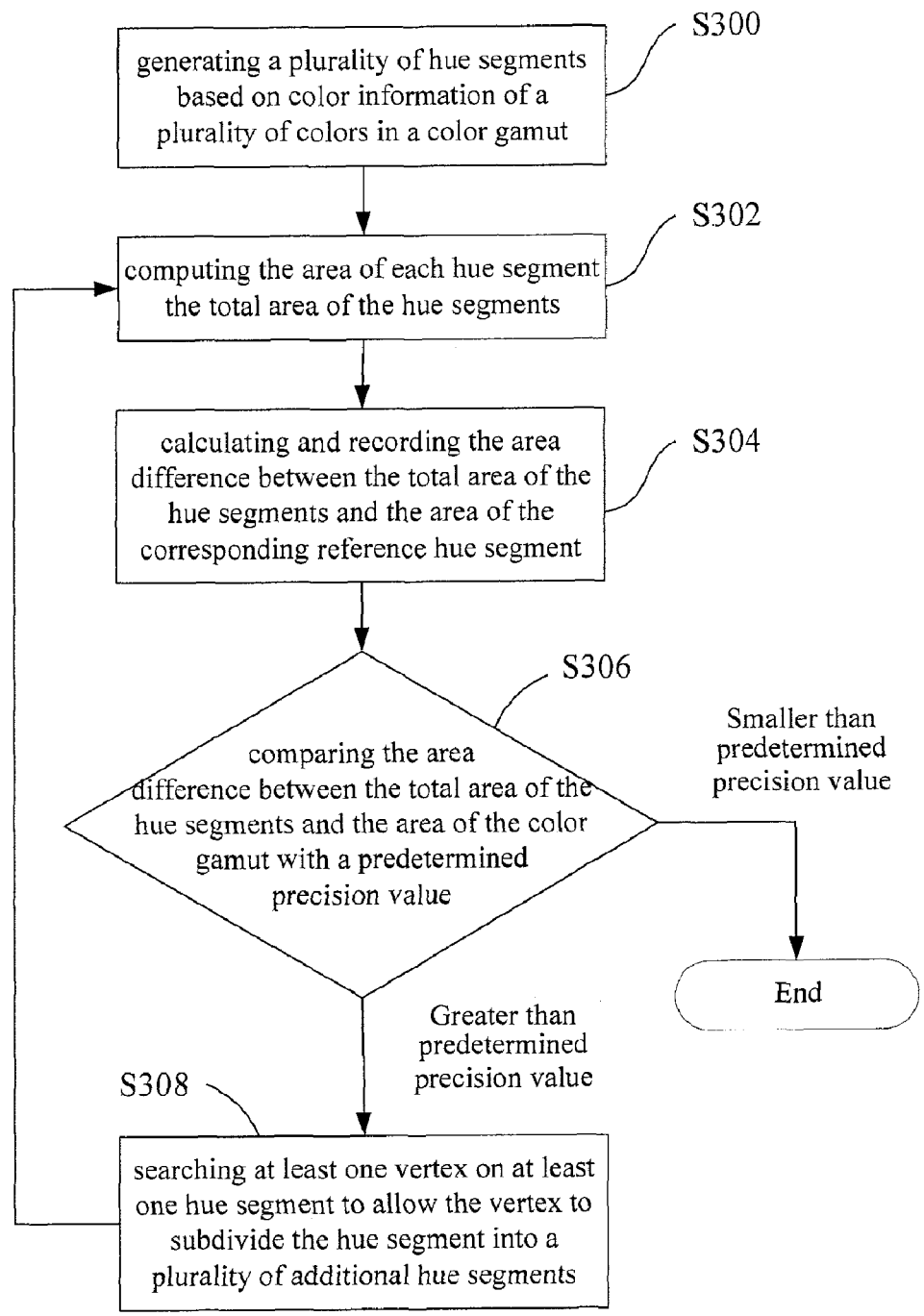
FIG. 3 is a flow chart of performing the hue segmentation system shown in FIG. 2 according to one embodiment of the present invention.
Figure 4:
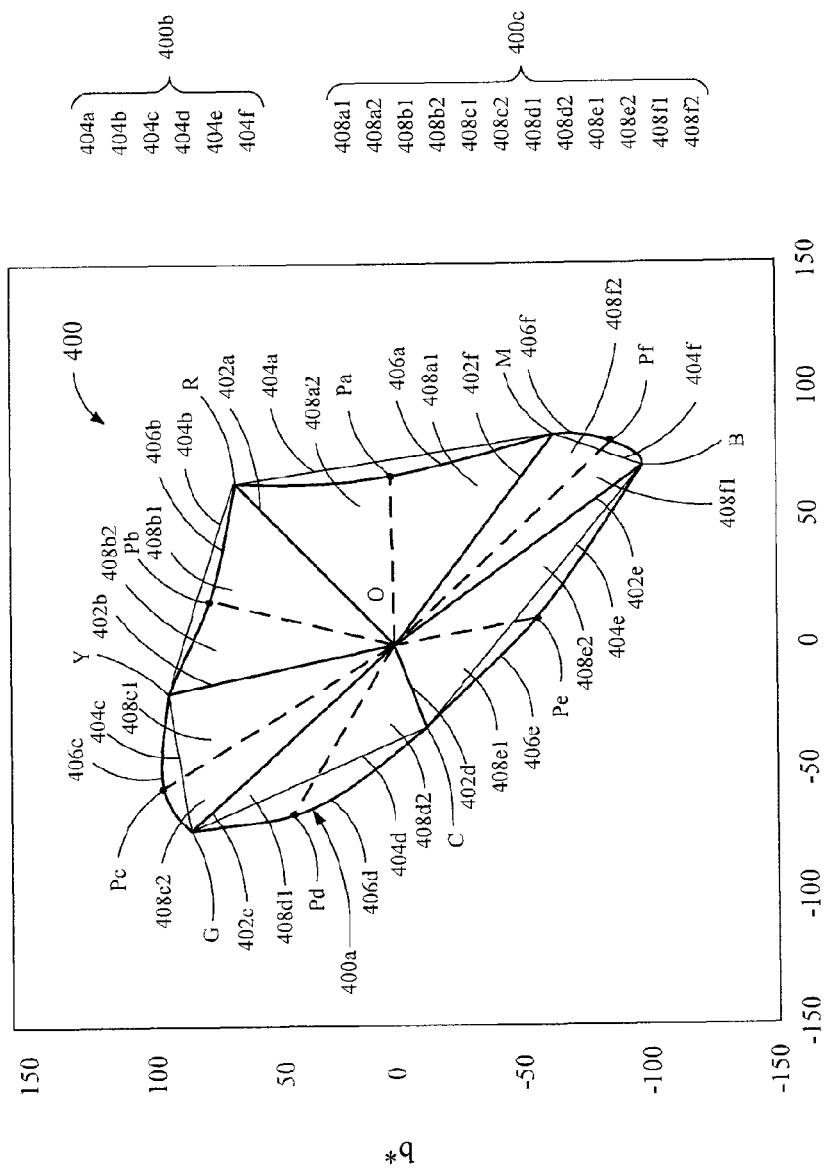
FIG. 4 is a schematic diagram of a color gamut having a plurality of hue segments and additional hue segments according to one embodiment of the present invention.

FIG. 3 is a flow chart of performing the hue segmentation system shown in FIG. 2 according to one embodiment of the present invention. FIG. 4 is a schematic diagram of a color gamut 400 having a plurality of hue segments and additional hue segments according to one embodiment of the present invention. The vertical axis "a*" represents the coordinate value from the green color to the red color, and the axis "b*" represents the coordinate value from the blue color to the yellow color. In one embodiment, the color gamut 400a including the origin of the coordinate is the reference color region enclosed by the 360 hue angles. The color gamut 400b is enclosed by the six vertexes "R", "Y", "G", "C", "B", and "M". The color gamut 400c is enclosed by the twelve vertexes "R", "Pf", "Y", "Pb", "G", "Pd", "C", "Pc", "B", "Pe", "M", and "Pa". In FIG. 3, the flow chart of performing the hue segmentation system is represented as the following steps:

In step S300, the hue segment generation module 200 computes a plurality of hue angles (402a~402f) of the basic colors within the color gamut 400b and calculates the maximum chroma value corresponding to each basic hue angle by inputting the color information of the basic colors for generating a plurality of hue segments (404a~404f) within the color gamut 400b. As shown in FIG. 4, the hue segment 404a is triangle "MOR", the hue segment 404b is triangle "ROY", the hue segment 404c is triangle "YOG", the hue segment 404d is triangle "GOC", the hue segment 404e is triangle "COB", and the hue segment 404f is triangle "BOM". In one embodiment, the basic colors may be red-green-blue (RGB) and cyanmagenta-yellow (CMY). It is noted that the number of the hue segments is not limited to six but may be various number, such as twelve hue segments.

In step S302, the hue segment generation module 202 computes the area of each hue segments (404a~404f) and the total area of the hue segments (404a~404f), and then inputs the computation result of the area into the segment area difference computation module 204.

In step S304, the segment area difference computation module 204 calculates and records the area difference between the total area of the hue segments (404a~404f) and the area of the reference hue segments (406a~406f). The segment area difference computation module 204 accumulates the area difference between each hue segment and each reference hue segment and inputs the accumulated result to the comparing unit 206.

In step S306, the comparing unit 206 compares the area difference between the total area of the hue segments (404a~404f) and the area of the color gamut with the predetermined precision value. If the area difference between the total area of the hue segments and the area of the color gamut is greater than the predetermined precision value, the hue segmentation system proceeds to the additional hue segment generation module 208 to perform step S308.

In step S308, the additional hue segment generation module 208 selects the hue segment, e.g. hue segment 404d, having the maximum area difference according to the area difference between each hue segment (404a~404f) and each reference hue segment (406a~406f) from the segment area difference computation module 204. The additional hue segment generation module 208 searches the chroma value to be served as one vertex "Pd" on the hue segment 404d wherein the vertex "Pd" on the hue segment 404d has either a minimum chroma value or the maximum chroma value. Thus, the additional hue segment generation module 208 divides the hue segment into a plurality of additional hue segments (408d1, 408d2) to replace the hue segments 404d. The additional hue segments 408d1 is triangle "GOPd" and additional hue segments 408d2 is triangle "PdOC".

Returning to step S302, the segment area computation module 202 and the segment area difference computation module 204 computes the area of each divided hue segments, i.e. the additional hue segments (408d1, 408d2) and calculates the area difference between the area of the divided hue segments (408d1, 408d2) and the area of the corresponding reference hue segment. The total area difference between each divided hue segment (404a, 404b, 404c, 404d, 404e, 404f) and the additional hue segments (408d1, 408d2) is inputted to the comparing unit 206 to determine the total area difference is smaller than the predetermined precision value. If the area difference between the total area of the hue segments and the area of the color gamut is greater than the predetermined precision value, the hue segmentation system repeatedly proceeds to steps S308, S302, S304 and S306 until the area of the color gamut 400c, including hue segments (408a1, 408a2, 408b1, 408b2, 408c1, 408c2, 408d1, 408d2, 408e1, 408e2, 408f1, 408f2), is approximate to the color gamut 400a, including reference hue segments (406a~406f).

In another embodiment, the hue segmentation system is capable of searching one or more vertexes, e.g. vertexes (Pa~Pf), within at least one of the hue segments (404a~404f) for generating more additional hue segments (408a1, 408a2, 408b1, 408b2, 408c1, 408c2, 408d1, 408d2, 408e1, 408e2, 408f1, 408f2) to replace the hue segments (404a~404f). Then, returning to step S302, the hue segmentation system utilizes the segment area computation module 202, the segment area difference computation module 204, the comparing unit 206, and the additional hue segment generation module 208 to repeatedly perform the steps S302, S304, S306, and S308 until the total area of the hue segments (404a~404f) is smaller than the predetermined precision value.

According to the above-mentioned description, the hue segmentation system in the present invention computes a plurality of hue angles (402a~402f) within the color gamut 400 and calculates the maximum chroma value corresponding to each hue angle (402a~402f) for generating a plurality of hue segments (404a~404f) within the color gamut 400. Afterwards, the segment area difference computation module 204 further calculates the area difference between the area of each hue segments (404a~404f) and each reference hue segments (406a~406f) to select the hue segments having the maximum area difference. The chroma value to be served as one vertex on a hue segment is searched to divide the hue segment into a plurality of additional hue segments so that the total area of the hue segments (408a1~408f2) is approximate to the reference hue segments (406a~406f), i.e. the area of the color gamut 400. The feature of the present invention is the number of the hue segments is smaller the conventional 360 hue angles. Thus, the present invention can utilizes simple computation, e.g. interpolation method, to compute the color information of the color gamut in order to improve the complexity and time-consuming of the computation.

Figure 5B:
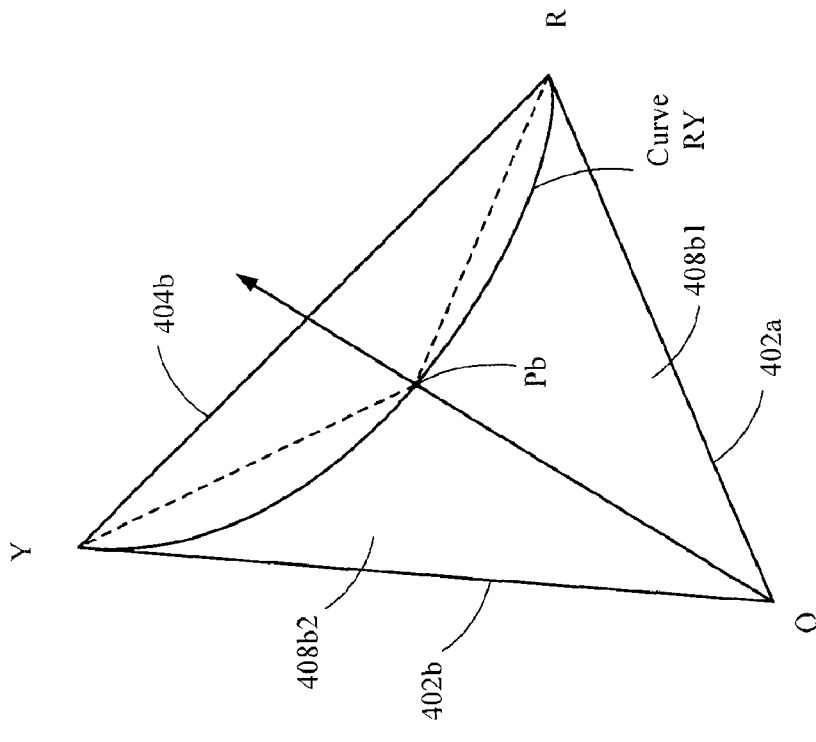
FIGS. 5A and 5B are schematic detailed diagrams of one hue segment and the additional hue segments thereof shown in FIG. 4 according to one embodiment of the present invention.
Figure 5A:
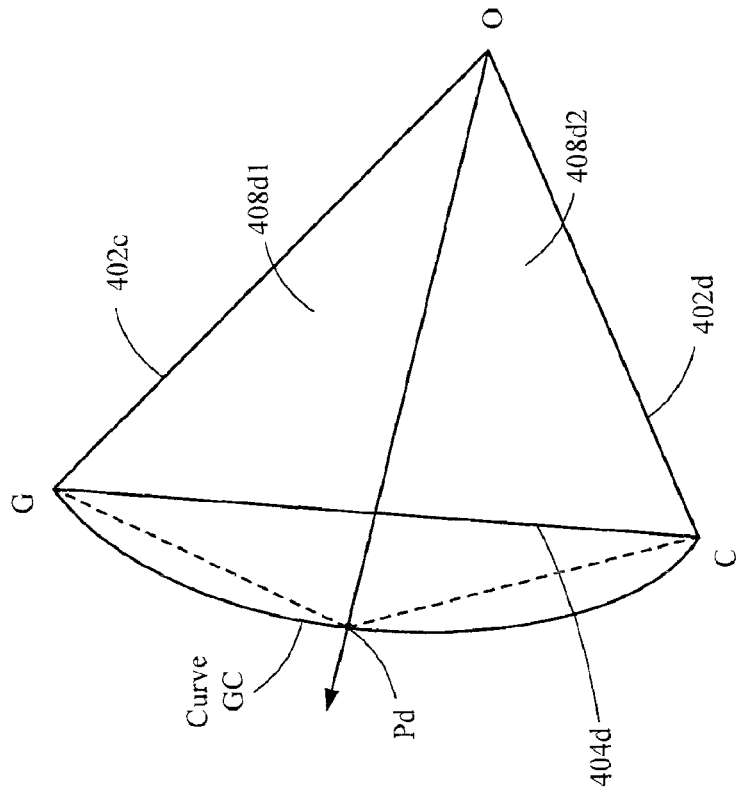

FIG. 2, FIGS. 5A and 5B are detailed schematic diagrams of one hue segment and the additional hue segments thereof shown in FIG. 4 according to one embodiment of the present invention. In one embodiment shown in FIG. 5A, the hue angle 402c and hue angle 402d are 136 degrees (corresponding to basic color, green color) and 195 degrees (corresponding to basic color, cyan color), respectively. The hue segment 404d is a triangle region enclosed by hue angle 402c, hue angle 402d and line "GC". The reference hue segment 406d is a triangle region enclosed by hue angle 402c, hue angle 402d and curve "GC". The segment area computation module 202 computes the area of the hue segment 404d, and the segment area difference computation module 204 computes and records the area difference between the hue segment 404d and the reference hue segment 406d. If the total difference area of the hue segments is greater than the predetermined precision value and the difference area of hue segment 404d is maximum value, the additional hue segment generation module 208 searches a vertex "Pd" having maximum chroma value on the curve "GC" to divide the hue segment 404d for generating the additional hue segments (408d1, 408d2). That is, the arrow line "OPd" subdivides the hue segment 404d. In one embodiment, the segment area computation module 202 computes the area of the hue segments (408d1, 408d2) to determine that the area of the hue segments (408d1, 408d2) is approximate to the area of the reference hue segment 406d corresponding to the curve "GC".

Similarly, in one embodiment shown in FIG. 5B, the hue segment 404b is a triangle region enclosed by hue angle 402a, hue angle 402b and line "RY". The reference hue segment 406b is a triangle region enclosed by hue angle 402a, hue angle 402b and curve "RY". The segment area computation module 202 computes the area of the hue segment 404b, and the segment area difference computation module 204 computes and records the area difference between the hue segment 404b and the reference hue segment 406b. If the total difference area of the hue segments is greater than the predetermined precision value and the difference area of hue segment 404b is maximum value, the additional hue segment generation module 208 searches a vertex "Pb" having minimum chroma value on the curve "RY" to divide the hue segment 404b for generating the additional hue segments (408b1, 408b2). That is, the arrow line "OPb" subdivides the hue segment 404b. In one embodiment, the segment area computation module 202 computes the area of the hue segments (408b1, 408b2) to determine that the area of the hue segments (408b1, 408b2) is approximate to the area of the reference hue segment 406b corresponding to the curve "RY".

Figure 5C:
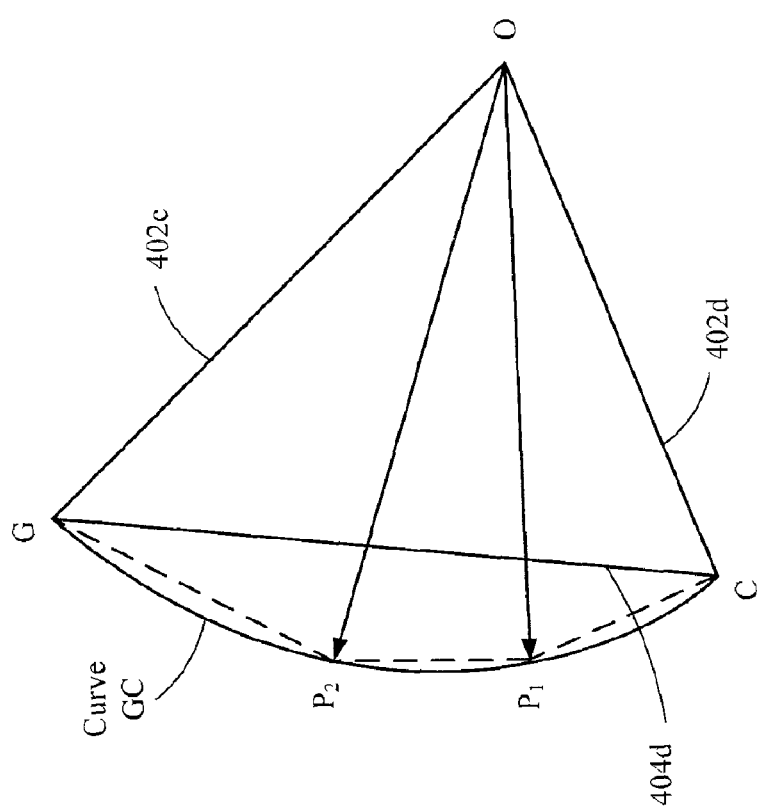
FIG. 5C is a schematic detailed diagram of one hue segment and the additional hue segments thereof shown in FIG. 4 according to another embodiment of the present invention.

FIG. 5C is a schematic detailed diagram of one hue segment and the additional hue segments thereof shown in FIG. 4 according to another embodiment of the present invention. The hue segmentation system is capable of searching one or more vertexes, e.g. vertexes $P_1$ and $P_2$, within one of the hue segments and compute the total area of the hue segments "$OCP_1$", "$OP_1P_2$", and "$OP_2G$" such that the total area is approximate o the area of the reference hue segment 406d corresponding to the cure "GC".

The present invention provides a hue segmentation method and system to solve the problem of conventional 360 hue angles. The hue segmentation method and system utilizes fewer hue pages to effectively decrease calculation times and meets the precision requirement of the color gamut in the image devices. Further, the hue segmentation method and system save required memory usage.

As is understood by a person skilled in the art, the foregoing preferred embodiments of the present invention are illustrative rather than limiting of the present invention. It is intended that they cover various modifications and similar arrangements included within the spirit and scope of the appended claims, the scope of which should be accorded the broadest interpretation so as to encompass all such modifications and similar structures.

What is claimed is:

1. A hue segmentation method for determining a color gamut of an image device, comprising:
   (a) generating a plurality of hue segments based on color information of a plurality of colors in a color gamut;
   (b) computing, using a processor, the total area of the hue segments;
   (c) calculating the area difference between the total area of the hue segments and the area of the color gamut;
   (d) comparing the area difference between the total area of the hue segments and the area of the color gamut with a predetermined precision value;
   (e) searching at least one vertex on at least one hue segment to allow the at least one vertex to subdivide the at least one hue segment into a plurality of additional hue segments when the area difference between the total area of the hue segments and the area of the color gamut is greater than the predetermined precision value; and
   (f) computing the area of the additional hue segments of the at least one hue segment so as to compute the total area of additional hue segments and the hue segments except the at least one hue segment until the area difference between the total area of additional hue segments and the hue segments except the at least one hue segment and the area of the color gamut is equal to or smaller than the predetermined precision value, and when the area difference between the total area of additional hue segments and the hue segments except the at least one hue segment and the area of the color gamut is greater than the predetermined precision value, repeating steps (b), (c), (d) and (e) until the area difference is equal to or smaller than the predetermined precision value.

2. The method of claim 1, further comprising a step of searching a plurality of reference hue segments corresponding to the hue segments, respectively, based on the angles of the hue segments, wherein the color gamut has the reference hue segments.

3. The method of claim 2, wherein the total area of the color gamut is equal to the area of 360 hue segments and the area of each reference hue segment is equal to some of the 360 hue segments.

4. The method of claim 2, further comprising, after step (a), a step of computing the area of each hue segment.

5. The method of claim 4, further comprising a step of computing the area difference between each hue segment and each reference hue segment correspondingly.

6. The method of claim 5, further comprising a step of recording the area difference between each hue segment and each reference hue segment correspondingly.

7. The method of claim 6, further comprising a step of accumulating the area difference between each hue segment and each reference hue segment for generating the area difference between the total area of the hue segments and the area of the color gamut.

8. The method of claim 7, further comprising, after step (c), a step of selecting one of the hue segments having the maximum area difference according to the area difference between each hue segment and each reference hue segment.

9. The method of claim 1, further comprising, after step (d), a step of searching a plurality of vertexes on the hue segments to allow the vertexes to subdivide the hue segment for generating a plurality of additional hue segments.

10. The method of claim 1, wherein step (a) comprises detecting the hue angles of the colors and the maximum chroma value of each hue angles.

11. The method of claim 10, wherein the vertex on the hue segment has either a minimum chroma value or the maximum chroma value.

12. The method of claim 1, further comprising a step of computing a plurality of basic hue angles of the color gamut and the maximum chroma value of each basic hue angle by using the color information for generating the hue segments.

13. A hue segmentation method for determining a color gamut of an image device, comprising dividing, using a processor, a color gamut into a plurality of hue segments and searching at least one vertex on at least one hue segment to allow the vertex to subdivide the at least one hue segment into a plurality of additional hue segments so that the area difference between the total area of additional hue segments and the hue segments except the at least one hue segment and the area of the color gamut is equal to or smaller than the predetermined precision value, and when the area difference between the total area of additional hue segments and the hue segments except the at least one hue segment and the area of the color gamut is greater than the predetermined precision value, repeating the step of searching at least one vertex on at least one hue segment to subdivide the at least one hue segment into a plurality of additional hue segments until the area difference is equal to or smaller than the predetermined precision value.

14. The method of claim 13, further comprising a step of searching a plurality of reference hue segments corresponding to the hue segments, respectively, based on the angles of the hue segments, wherein the color gamut has the reference hue segments.

15. The method of claim 14, wherein the total area of the color gamut is equal to the area of 360 hue segments and the area of each reference hue segment is equal to some of the 360 hue segments.

16. The method of claim 14, further comprising, after step (a), a step of computing the area of each hue segment.

17. The method of claim 16, further comprising a step of computing the area difference between each hue segment and each reference hue segment correspondingly.

18. The method of claim 17, further comprising a step of recording the area difference between each hue segment and each reference hue segment correspondingly.

19. The method of claim 18, further comprising a step of accumulating the area difference between each hue segment and each reference hue segment for generating the area difference between the total area of the hue segments and the area of the color gamut.

20. The method of claim 19, further comprising a step of selecting one of the hue segments having the maximum area difference according to the area difference between each hue segment and each reference hue segment.

21. The method of claim 13, further comprising a step of searching a plurality of vertexes on the hue segments to allow the vertexes to subdivide the hue segment for generating a plurality of additional hue segments.

22. A hue segmentation system, comprising:
   a processor and a memory;
   a hue segment generation module generating a plurality of hue segments based on color information of a plurality of colors in a color gamut;
   a segment area computation module coupled to the hue segment generation module, computing the total area of the hue segments;
   a segment area difference computation module, coupled to the a segment area computation module, calculating the area difference between the total area of the hue segments and the area of the color gamut;
   a computing unit computing the area difference between the total area of the hue segments and the area of the color gamut with a predetermined precision value; and
   an additional hue segment generation module coupled to the segment area computation module, the segment area difference computation module, and the comparing unit, respectively, the additional hue segment generation module searching at least one vertex on at least one hue segment to allow the vertex to subdivide the at least one hue segment into a plurality of additional hue segments when the area difference between the total area of the hue segments and the area of the color gamut is greater than the predetermined precision value;
   wherein the segment area computation module is configured to compute the area of the additional hue segments, and the segment area computation module, the segment area difference computation module, the comparing unit and the additional hue segment generation module further process the additional hue segments so that the area difference between the total area of additional hue segments and the hue segments except the at least one hue segment and the area of the color gamut is equal to or smaller than the predetermined precision value, and when the area difference between the total area of additional hue segments and the hue segments except the at least one hue segment and the area of the color gamut is greater than the predetermined precision value, the additional hue segment generation module search at least one vertex on at least one hue segment to subdivide the at least one hue segment into a plurality of additional hue segments until the area difference is equal to or smaller than the predetermined precision value.

23. The hue segmentation system of claim 22, wherein the color gamut has a plurality of reference hue segments and the additional hue segment generation module is configured to search the reference hue segments corresponding to the hue segments, respectively, based on the angles of the hue segments.

24. The hue segmentation system of claim 23, wherein the total area of the color gamut is equal to the area of 360 hue segments and the area of each reference hue segment is equal to some of the 360 hue segments.

25. The hue segmentation system of claim 23, wherein the segment area computation module is configured to compute the area of each hue segment.

* * * * *